(12) United States Patent
Biermann et al.

(10) Patent No.: US 9,145,963 B2
(45) Date of Patent: Sep. 29, 2015

(54) PLANETARY GEARBOX COMPRISING A DIFFERENTIAL

(71) Applicant: Schaeffler Technologies GmbH & Co. KG, Herzogenaurach (DE)

(72) Inventors: Thorsten Biermann, Wachenroth (DE); Harald Martini, Herzogenaurach (DE); Inaki Fernandez, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/517,207

(22) Filed: Oct. 17, 2014

(65) Prior Publication Data

US 2015/0038280 A1  Feb. 5, 2015

Related U.S. Application Data

(63) Continuation of application No. PCT/EP2013/057949, filed on Apr. 17, 2013.

(30) Foreign Application Priority Data

Apr. 19, 2012 (DE) .......................... 10 2012 206 449
Apr. 15, 2013 (DE) .......................... 10 2013 206 684

(51) Int. Cl.
*F16H 48/10* (2012.01)
*F16H 48/11* (2012.01)
*F16H 48/40* (2012.01)

(52) U.S. Cl.
CPC ............... *F16H 48/10* (2013.01); *F16H 48/11* (2013.01); *F16H 48/40* (2013.01); *F16H 2048/106* (2013.01)

(58) Field of Classification Search
CPC ... F16H 48/10; F16H 48/11; F16H 2048/106; F16H 2048/405
USPC .......................................... 475/248, 249, 253
See application file for complete search history.

(56) References Cited

U.S. PATENT DOCUMENTS

| | | | |
|---|---|---|---|
| 1,104,243 A * | 7/1914 | Brown | 475/198 |
| 2,142,575 A | 1/1939 | Spicacci | |
| 3,809,444 A | 5/1974 | Eckhardt et al. | |
| 4,368,932 A | 1/1983 | Wolzenburg | |
| 4,858,998 A * | 8/1989 | Welschof et al. | 301/126 |
| 7,775,928 B2 | 8/2010 | Zink | |
| 2003/0152303 A1* | 8/2003 | Wickens | 384/563 |

(Continued)

FOREIGN PATENT DOCUMENTS

| | | |
|---|---|---|
| DE | 10144798 A1 | 8/2002 |
| DE | 10156890 C1 | 4/2003 |

(Continued)

*Primary Examiner* — Huan Le
(74) *Attorney, Agent, or Firm* — Simpson & Simpson, PLLC

(57) ABSTRACT

A planetary gearbox (1, 101) having a differential gear (2, 102), having a planet carrier (3, 103) to which planet wheels (5, 6, 105) that are in meshed engagement with at least one sun gear (9, 10, 11, 106, 107) are rotatably connected, wherein the planet carrier (3, 103) can be connected to a drive wheel (15), wherein in addition a bearing (19, 108) having an inner bearing ring (29) and an outer bearing ring (28, 117) rotatably mounts the planet carrier (3, 103) in a stationary housing determining the axial and/or radial position of said carrier, wherein the outer bearing ring (28, 117) is rotatably fixedly connected to the planet carrier (3, 103) and the inner bearing ring (29) is connected to the stationary housing.

9 Claims, 8 Drawing Sheets

(56) References Cited

U.S. PATENT DOCUMENTS

2005/0011717 A1 1/2005 Arnault
2014/0329634 A1* 11/2014 Biermann et al. ............ 475/220

FOREIGN PATENT DOCUMENTS

| | | |
|---|---|---|
| DE | 102007004712 A1 | 8/2008 |
| DE | 102007004715 A1 | 8/2008 |
| DE | 102009017397 A1 | 11/2009 |
| DE | 102010036247 A1 | 3/2012 |
| EP | 0156067 A1 | 10/1984 |
| GB | 565204 A | 10/1944 |
| WO | 2008092526 a1 | 8/2008 |
| WO | 2010112366 A1 | 10/2010 |

* cited by examiner

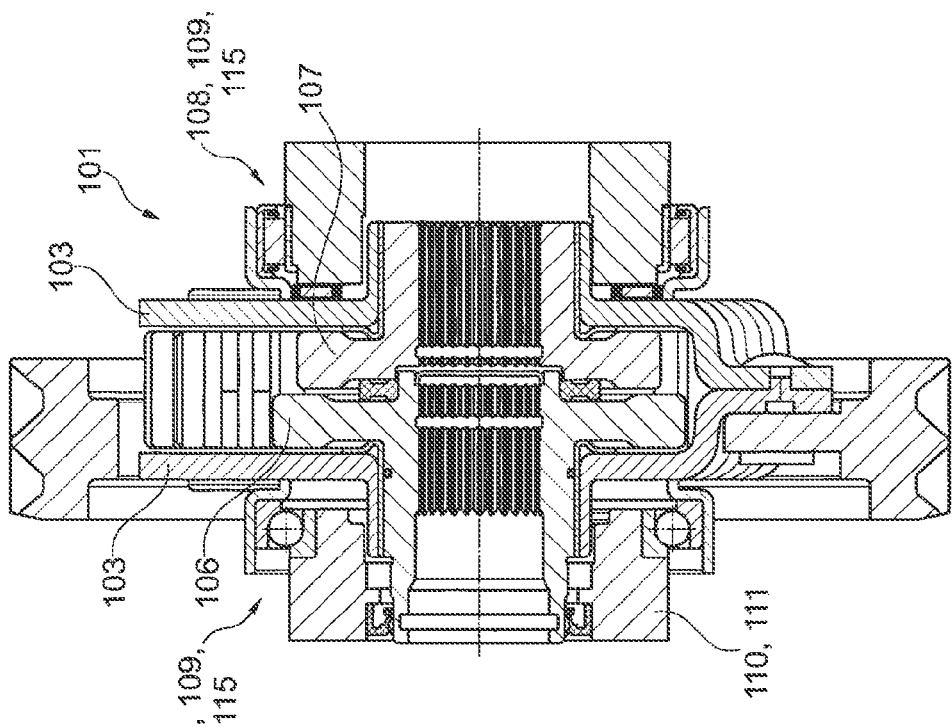
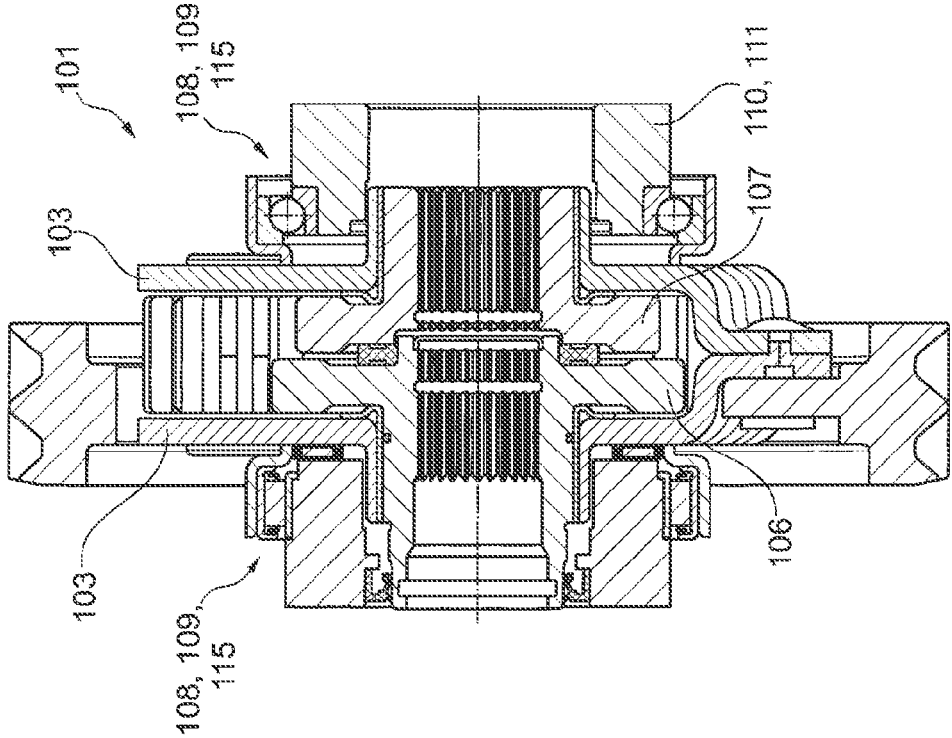

PLANETARY GEARBOX COMPRISING A DIFFERENTIAL

CROSS-REFERENCE TO RELATED APPLICATIONS

This patent application is filed under 35 U.S.C. §119(a) and 35 U.S.C. §111(a) as a continuation of PCT Patent Application PCT/EP2013/057949, filed Apr. 17, 2013, and claims priority thereto, and claims priority to German Patent Application DE 102012206449.4, filed Apr. 19, 2012, and German Patent Application DE 102013206684.8, filed Apr. 15, 2013, which applications are hereby incorporated by reference in their entireties.

FIELD OF THE INVENTION

The invention relates to a planetary gearbox, such as a differential, having a planet carrier to which planet wheels that are in meshing engagement with at least one sun gear are rotatably connected, wherein the planet carrier can be connected to a drive wheel, such as a spur gear, wherein in addition a bearing having an inner bearing ring and an outer bearing ring, such as a roller bearing, rotatably mounts the planet carrier in a stationary housing, such as a gear housing, determining the axial and/or radial position of said carrier.

The planet carrier can also be designated as a cage, in particular it can be designed as a differential cage.

BACKGROUND OF THE INVENTION

Different planetary gearboxes are already known from the prior art, such as, for example, from EP 0156067.

Basically, differential gears for motor vehicles are known from DE 10156890 C1. There, a differential gear is disclosed for a motor vehicle with a differential housing having a drive sprocket mounted in a housing wall, in which housing a cross pin is arranged with at least one rotatably mounted pinion, which is engaged with a driveshaft sprocket of a driveshaft mounted in the differential housing. The driveshaft is mounted by means of at least one first bearing in the housing wall of the differential gear and/or of the differential housing by means of at least one second bearing on the driveshaft, and the driveshaft has a common bearing bush for the first bearing of the driveshaft designed as a shaft bearing and for the housing bearing of the differential housing.

A differential arrangement drawing on bevel gears is also known from U.S. Pat. No. 7,775,928.

Further, a gear arrangement is known from DE 10 2009 017 397 A1, which draws on planetary gearboxes. The gear arrangement presented there relates to a differential gear having a drive-side plate part, a first drive member which is rotationally fixedly connected to a first driven axle, and a second drive member, which is rotationally fixedly connected to a second driven axle, wherein a toothed wheel assembly is provided between the first drive member and the second drive member for transmitting torque from the drive side plate part to the first drive member and the second drive member. The first drive member has thereby the shape of a first drive plate and has a bulge spaced at a radial distance from the first driven axle. The second drive part additionally has the shape of a second drive plate extending radially outward from the second driven axle. Further, the bulge points away from the second drive plate. The toothed wheel arrangement is arranged in a space formed by the bulge of the first drive plate and the opposing region of the second drive plate.

Planetary gearboxes of this type, which are designed as differential gears, can be designed as spur gear differential gears, such as are known, for example, from WO 2010/112366 A1. The spur gear differential gear arrangement depicted there discloses the utilizability in a motor vehicle. Bevel toothed sun gears, planetary gearboxes, and a ring gear of a surrounding housing with supported bearings are thereby respectively used, such that the parallel arranged sun gears are each coupled to parallel arranged driveshafts. It is provided in this document that friction surfaces are respectively arranged between the parallel arranged sun gears and/or between the sun gears and the surrounding housing.

The known planetary gearboxes have, however, the disadvantage that they require a lot of axial installation space. It is the object of the present invention to create a remedy for this and to create a space-saving, in particular an axial installation space saving, improvement, which can be implemented durably and at the same time at least cost-neutrally, or, in the optimal case, even with a cost-reducing effect.

BRIEF SUMMARY OF THE INVENTION

The problem is inventively solved in that the outer bearing ring is rotatably fixedly connected to the planet carrier and the inner bearing ring is connected to the stationary housing. An arrangement of this type can be achieved substantially more favorably than with respect to the known solutions, in which the planet carrier has an axially outward pointing collar onto which the inner bearing ring is forced. A less expensive, lighter, and more durable planetary gearbox can be realized in this way.

Advantageous embodiments are claimed in the dependent claims and will be subsequently explained in more detail.

It is thus advantageous if the outer bearing ring is connected directly to the planet carrier in a form-fitting and/or force-fitting and/or firmly bonded way.

An embodiment of the invention provides that the bearing supports itself on an outer bearing ring disposed firmly bonded on the planet carrier, which outer bearing ring is also designated as a support pot based on the function and the appearance.

The firmly bonded connection is configured indissolubly and can be configured as a welded, soldered, adhesive, or vulcanized connection. In addition, force-fit and/or form-fit connection types can also naturally be added in support. The use of laser, friction, and/or inert gas welding methods is advantageous.

The outer bearing ring is not compelled to have a step, but rather can be configured as a simple ring without a step. The designation as a sleeve or hollow cylinder can be used equivalently.

It is thus advantageous if the bearing supports itself axially and/or radially on the outer bearing ring. A tipping or shifting of the planetary gearbox within the transmission can then be effectively eliminated.

It is beneficial for the durability if the bearing is configured as a roller bearing. Then, a conglomeration of standard elements can also be drawn on that are tested on the one hand and inexpensive on the other.

Configuring the roller bearing as a combined axial-radial roller bearing, as an inclined ball bearing, as a tapered roller bearing, or as a self-aligning roller bearing allows an especially targeted reaction to the forces in contact with the planetary gearbox and actual circumstances. Combined axial-radial roller bearings are inherently known, for example, from U.S. Pat. No. 3,809,444.

As already explained, it is advantageous if the outer bearing ring is welded to the planet carrier. In particular, tested welding methods, like friction welding, plasma welding, or laser welding methods can then be used inexpensively with good results.

If the outer bearing ring stands with an end on a substantially radially directed contact area, and is welded there, preferably circumferentially and/or continuously, then the accuracy of fit can be increased on the one hand and an especially good welding can be achieved on the other, by which means the loading capacity is improved.

An advantageous embodiment is also characterized in that the contact area is present on the face of the planet carrier, wherein on the radial end thereof a flange extension extends directed in the axial direction. In this way, the bearing can be shifted outward in the radial direction, due to which the entire construction and the planetary gearbox can be kept narrow or the contact surfaces can be brought axially closer to each other.

It is also useful if the planetary gearbox is designed as a spur gear differential with two sun gears and two planet wheel sets, preferably of the type in which the planet wheels of the two planet wheel sets engage with each other, wherein, in addition, the planet wheels of the one planet wheel set preferably engage with the one sun gear and the planet wheels of the other planet wheel set engage with the other sun gear.

If two bearings are present between the planet carrier and the housing, preferably axially on the two sides of the sun gears, and, in addition, the two bearings are preferably configured the same or differently, then an efficient bearing can be guaranteed. It is advantageous if the two bearings are each designed as combined axial-radial roller bearings, or are each designed as inclined ball bearings (X or O arrangement), or are a combination of these two types of roller bearings, thus that one roller bearing is configured as a combined axial-radial roller bearing and the other is configured as an inclined ball bearing. The position of the respective inclined ball bearings can thus be exchanged.

A special feature of the arrangement with different roller bearings, thus for example a roller sleeve bearing on the one side of the planet carrier and an axial bearing on the same side, in order to generate a combined axial-radial roller bearing, is that the axial bearing is guided by a welded projection or by the region of the outer bearing ring closest to the contact area.

In other words, the bearing arrangement of the invention is reversed from the standard, namely the outer bearing ring accepts the planet carrier that can also be designated as a differential cage, and the inner bearing ring is seated on a stud of the housing. The bearing ring or a carrier for the bearing ring is welded directly to the planet carrier.

An embodiment of the invention provides that the outer bearing ring and the planet carrier are connected via a connection component that is a separate part from the two components. In the first alternative, this allows the reduction of individual parts, which thus lowers assembly costs and further reduces the weight of this type of planetary gear. The second variant, however, has the advantage that different demands regarding the usable geometry can be responded to in a need-based manner.

In order to be able to draw on tested individual components, it is advantageous if the bearing is designed as a ball bearing, preferably as an inclined ball bearing or as a needle bearing, roller bearing, or a tapered roller bearing.

It is also advantageous if the connection part is designed as a sheet metal sleeve which has a first flange section and a second flange section, which are connected to each other via a connection section. The two flange sections extending preferably in the axial direction can be used to connect to the bearing and the planet carrier, for example, using a press fit.

An advantageous embodiment is also characterized in that the connection section extends in the radial direction and preferably flatly abuts the planet carrier partially or completely. The force transmission can then be optimized.

If the first flange section is spaced radially less far from the rotational axis of the planet carrier than the second flange section, which is connected to the outer bearing ring of the roller bearing or forms the same, then the assembly can be simplified.

It is further advantageous if the second flange section is arranged oblique to the axial direction and to the radial direction.

If the planetary gearbox is designed as a spur gear differential that has two sun gears, which are each placed in meshed engagement with a planet wheel of at least one planet wheel set, then a planetary gearbox embodiment that is particularly compact to build can be realized, which is at the same time highly durable and inexpensive. Gear differentials can thus be eliminated, which is positively noticeable with regard to the use of installation space. It should be noted that the two planet wheels of a planet wheel set can also engage with each other and they should also do so in certain applications.

In order to be able to realize positive self-locking effects, it is advantageous if a friction plate is placed between the sun gears.

It is also advantageous if the planet carrier and/or the part engaging with the outer side of the bearing, such as the outer bearing ring or the connection part, has/have a collar section that can be aligned with the sun gear that is/are preferably placed in contact with the sun gear, wherein the respective collar is configured as hardened. The centering of one or two sun gears can then be achieved simply and inexpensively.

BRIEF DESCRIPTION OF THE DRAWINGS

The invention will also be subsequently explained with the aid of the drawings, in which different embodiments are depicted.

FIG. 8 illustrates a further variant of an inventive planetary gearbox with a combined axial-radial roller bearing on the one side of the planet carrier and an inclined ball bearing on the other side;

FIG. 9 illustrates a further embodiment of an inventive planetary gearbox in a depiction comparable to one of those shown in FIGS. 5, 7, and 8, wherein an inclined ball bearing is present on the one side of the planet carrier and a combined axial-radial roller bearing is present on the other side;

DETAILED DESCRIPTION OF THE INVENTION

The figures are merely schematic in nature and thus only serve the understanding of the invention. The same elements are provided with the same references.

Figure 1:
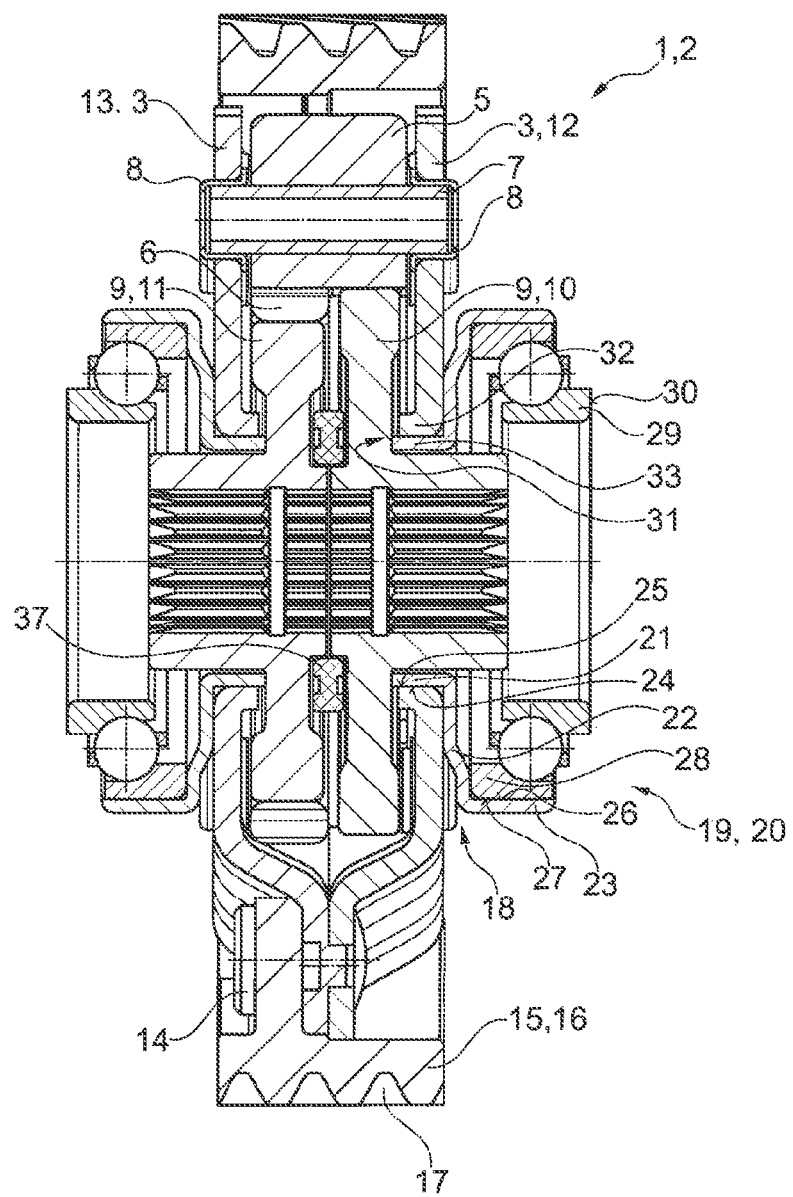
FIG. 1 illustrates a first embodiment of an inventive planetary gearbox in a longitudinal depiction.

FIG. 1 depicts a first embodiment of an inventive planetary gearbox 1. The planetary gearbox 1 is designed as a differential gear, in particular as a spur gear differential 2. It has a planet carrier 3, which can be designated as a cage, in particular as a differential cage. The planet carrier 3 can further be designated as a planet wheel carrier.

Planet wheel sets 4, each having a first planet wheel 5 and a second planet wheel 6, are mounted on the planet carrier 3 respectively via a pin 7, which is placed in a bearing sleeve 8. The planet wheels 5 and 6 are in functional contact with a sun gear 9. The first planet wheel 5 is thereby in meshed functional engagement with a first sun gear 10 and the second planet wheel 6 is in meshed functional contact with a second sun gear 11. The pin 7 is designed as a hollow pin.

It is advantageous to use three, four, five, six, or seven planet wheel sets 4, each having a first planet wheel 5 and a second planet wheel 6.

The planet carrier 3 has a first half 12 and a second half 13, which are connected via a connection element 14, like a rivet on a drive wheel 15, which is designed as a spur gear 16. The spur gear 16 has outer helical teeth 17.

The planet carrier 3 is connected to a bearing 19, which is designed as a roller bearing 20, via a separate connection piece 18. The roller bearing 20 is designed as an inclined ball bearing. An inclined ball bearing is placed respectively on the first half 12 of the planet carrier 3 as well as on the second half 13 of the planet carrier 3. A tapered roller bearing is also possible.

The connection piece 18 thereby has a first flange section 21, which is connected to a second flange section 23 via a connection section 22. The first flange section 21 thereby forms a first boundary surface 24, which is placed in contact with an inner surface 25 of the planet carrier 3. The second flange section 23 further forms a second boundary surface 26, which is placed in contact with an outer surface 27 of the bearing 19. The second boundary surface 26 thereby contacts at an outer bearing ring 28 of the roller bearing 20.

The inner bearing ring 29 is connected radially to a stationary housing (not shown) placed radially inside the bearing 19 and offset axially substantially to the right, for example, via a form and/or force fit, in particular using a press fit. A shoulder 30 then abuts at a surface extending in the radial direction of this stationary housing, which also operates as the gearbox housing.

The planet carrier 3 and the connection part 18 are designed such that they form a connection 31, which is aligned at the respective sun gear 9, thus the first sun gear 10 or the second sun gear 11. The planet carrier 3 thereby forms an axially aligned connection section 32 orthogonally spaced from the remainder of the planet carrier, which connection section is aligned parallel to a connection section 33 of the connection part 18. The two connection sections 32 and 33 end at the same height in the embodiment according to FIG. 1, i.e., in one and the same radial plane, and are placed in contact with the respective sun gear 9. At least one of the two connection sections 32 and 33, preferably both connection sections 32 and 33, are configured as hardened.

Figure 2:
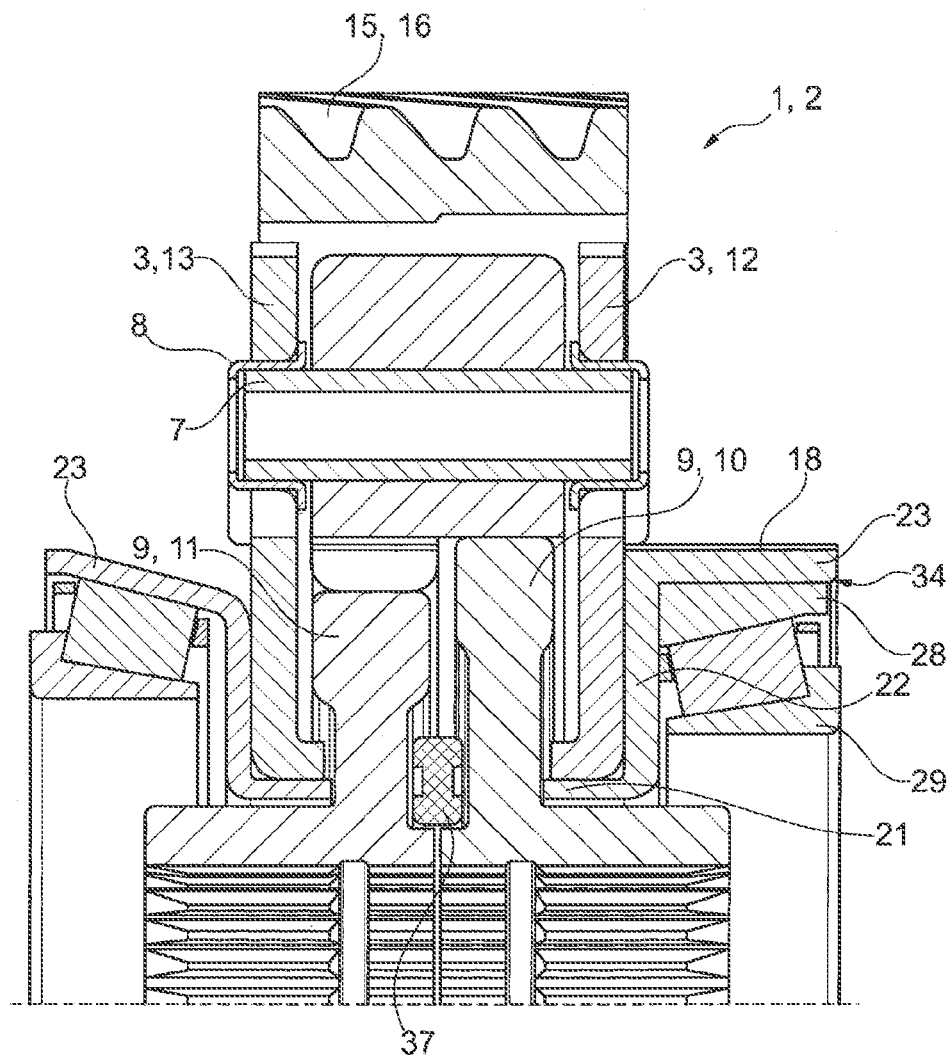
FIG. 2 illustrates a section of a second embodiment of an inventive planetary gearbox in a longitudinal depiction.

The embodiment according to FIG. 2 corresponds broadly to the embodiment according to FIG. 1; however, a caulking 34 is present. The connection part 18 is thus secured on the outer bearing ring 28 by means of the caulking 34. Inherently, this caulking 34 can also be applied on the inner bearing ring 29 if a variant is further followed in which the planet carrier 3 is connected to the inner bearing ring 29. In this case, however, the presence of the caulking 34 on the outer bearing ring 28 presents a higher stability at a lower flexibility. Specific forming techniques, such as the "smart fit bearing," can also be better used. Standard sizes can also be better used. This is additionally advantageous because then a defined impact point is present during the assembly.

Figure 3:
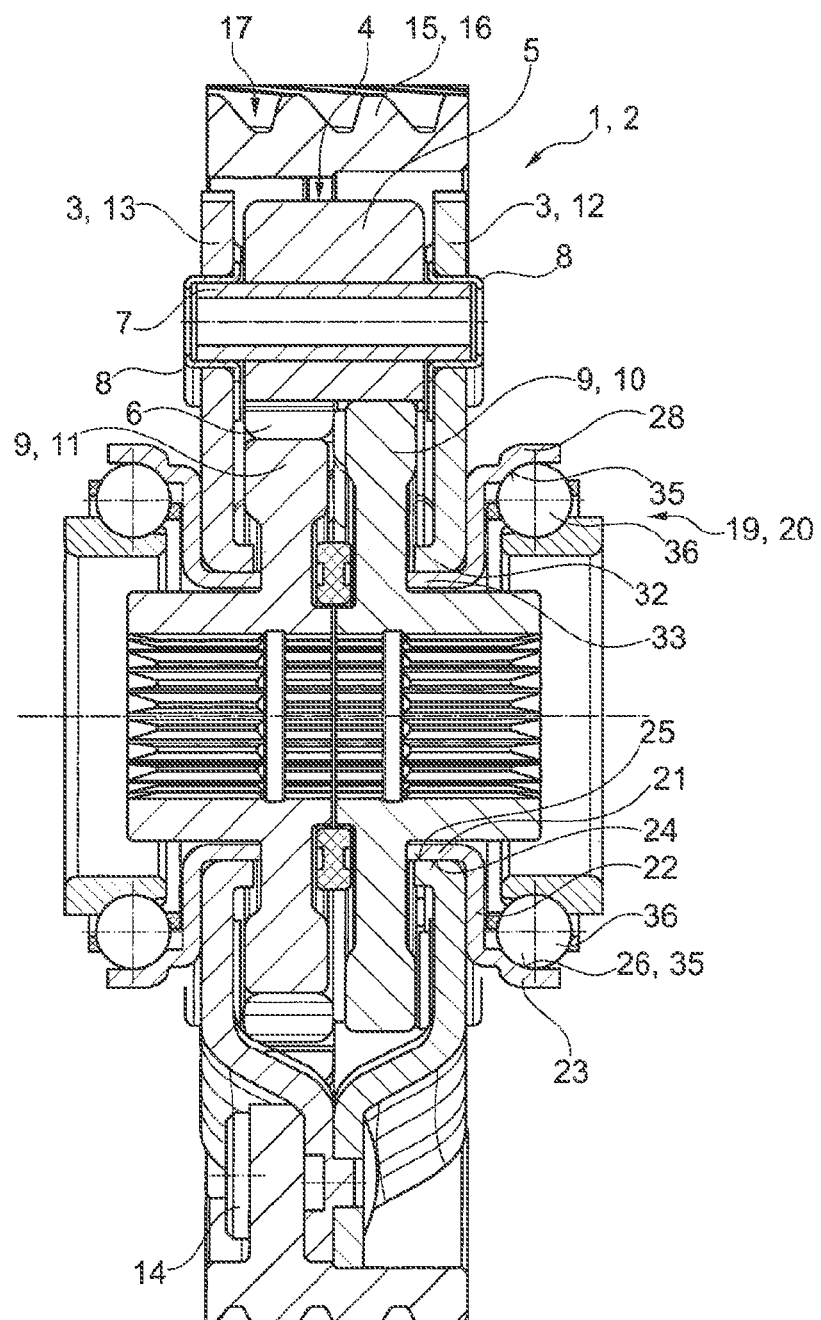
FIG. 3 illustrates a third embodiment of an inventive planetary gearbox in a longitudinal depiction.

A separate connection part 18 is no longer present in the embodiment depicted in FIG. 3, instead the outer bearing ring 28 is modified such that it is designed not only as a running surface 35 for the rolling elements 36, but also is rigidly connected to the planet carrier 3. In this embodiment, the connection section 33 of the outer bearing ring 28 projects axially further inward in the direction of the first sun gear 10 than the connection section 32 of the planet carrier 3. The outer bearing ring 28 is corrugated on the outer surface thereof. Further, the outer bearing ring 28 is designed as a drawn outer bearing ring 28, which has positive effects on the track characteristics and is likewise noticeably positive during the course of the respective sun gear. The planetary gearbox 1 is designed as a spur gear differential 2, like the respective embodiments of FIGS. 1, 2, and 4.

The running surface 35 is designed in the region of the second boundary surface 26. The rolling elements 36, which are designed here as balls, can roll on this running surface 35.

Figure 4:
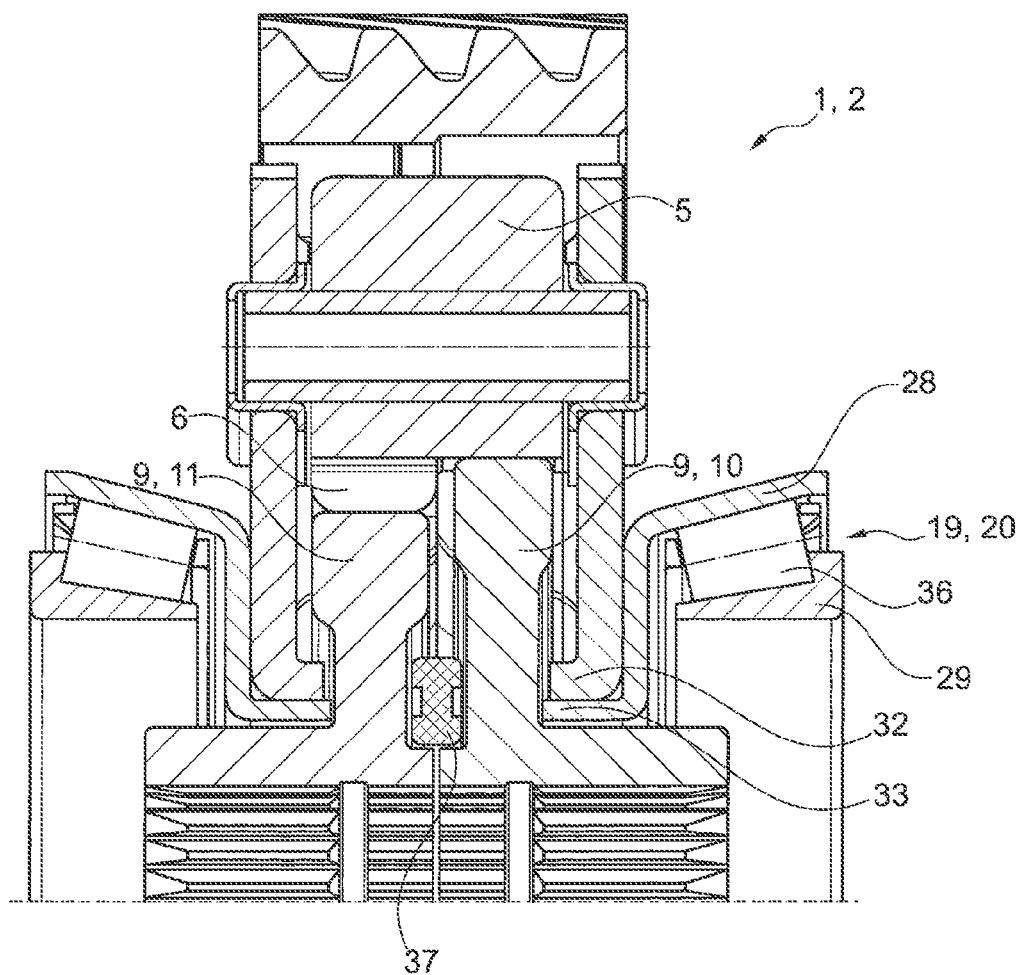
FIG. 4 illustrates a fourth embodiment of an inventive planetary gearbox depicted in part in a longitudinal depiction.
Figure 7:
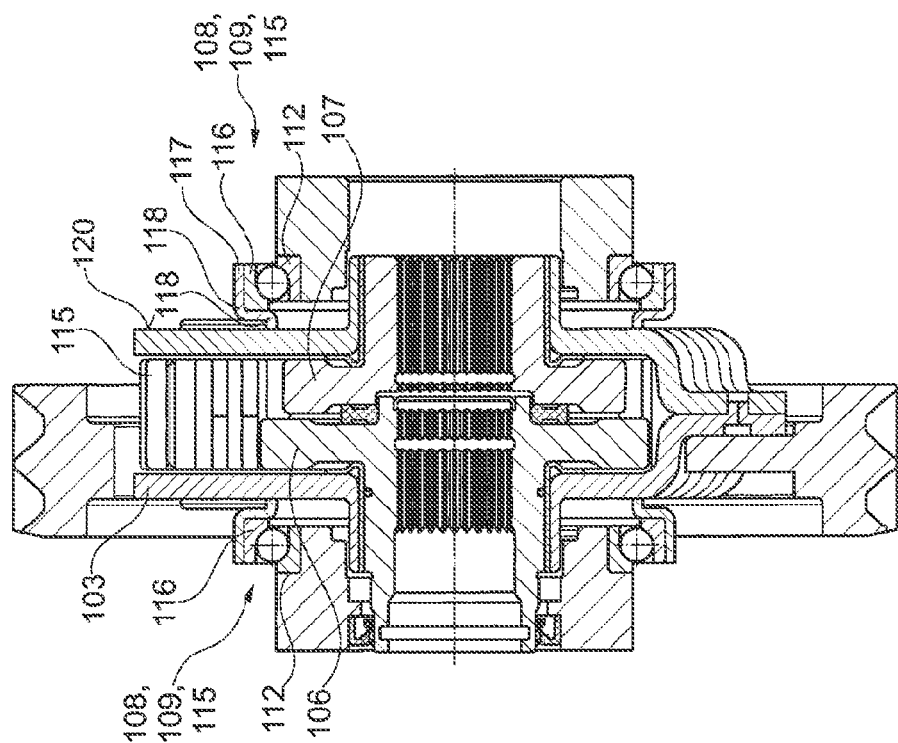
FIG. 7 illustrates a variant of an inventive planetary gearbox with two inclined ball bearings.

The embodiment according to FIG. 4 differs from the embodiment according to FIG. 3 in that the device forming the outer bearing ring 28 in the region of the rolling elements 36 indeed runs straight to the outer side of the outer bearing ring 28, yet is aligned obliquely or transversely to the radial axis as well as to the axial axis of the planetary gearbox. In this embodiment, only the connection section 33 is placed in contact with the first sun gear 10.

A friction plate 37 is placed between the two sun gears 10 and 11 and can be brought into contact with both sun gears.

Figure 5:
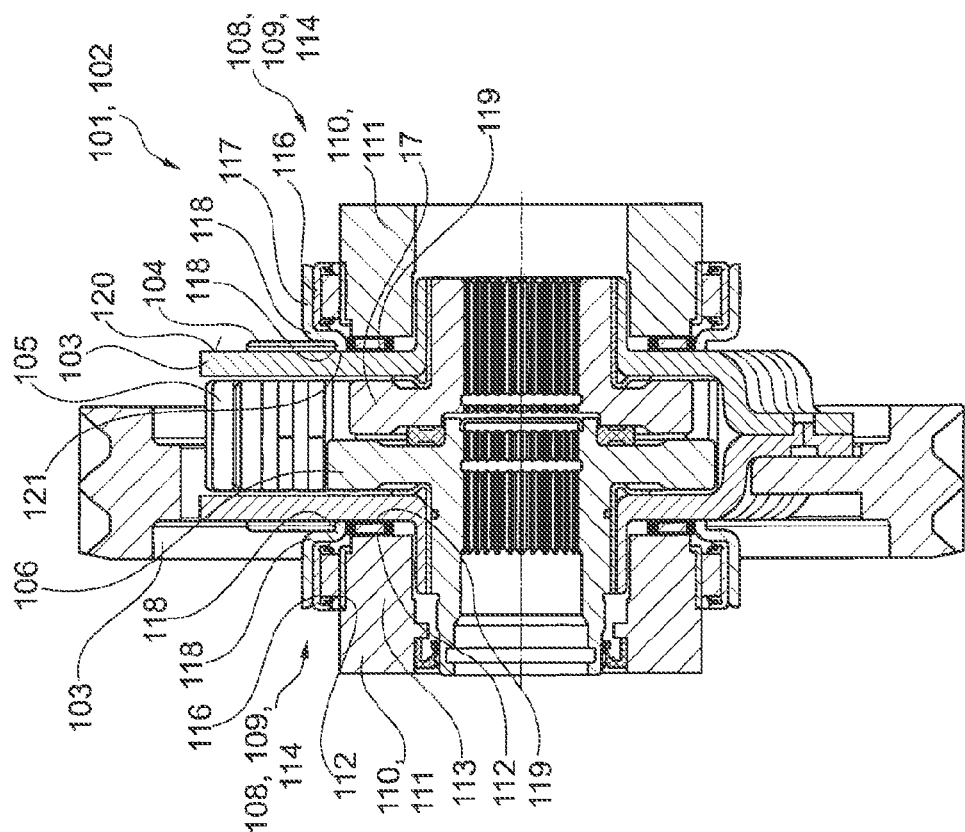
FIG. 5 illustrates a longitudinal section through an inventive planetary gearbox, wherein two combined axial-radial roller bearings are used by using a roller sleeve bearing and an axial bearing.

A first embodiment of an inventive planetary gearbox 101 is depicted in FIG. 5. The planetary gearbox 101 is designed as a differential gear 102. It is used in a motor vehicle, in particular in a powertrain. The powertrain can ensure a connection to an internal combustion engine and/or an electric motor and one or more drive elements. The differential gear can be used in a passenger vehicle, a commercial vehicle, or another ground-based vehicle.

A planet carrier 103 is present, which has two substantially identical halves. At least one planet wheel 105 is mounted on the planet carrier 103 via a bearing sleeve 104, which can also be designed as a pin. The planet wheel 105 is part of a first planet wheel set. A further planet wheel (only indicated) is part of a second planet wheel set. The planet wheel 105 engages with a sun gear 106. The other planet wheel engages with a further sun gear 107. It is created as a spur gear differential.

The planet carrier 103 supports itself on a housing 110, which is formed as the gearbox housing 111, via a bearing 108, which is implemented as a roller bearing 109.

To be exact, the bearing 108 supports itself axially and radially using an inner bearing shell 112 on a stud 113 of the gearbox housing 111. The bearing 108 is namely a combined axial-radial roller bearing 114 in the embodiment depicted in FIG. 5. In anticipation of FIG. 8, it is already mentioned now that the bearing 108 can also be designed as an inclined ball bearing 115.

Returning to the embodiment according to FIG. 5, it should be mentioned that the bearing 108 also has at least one outer bearing shell 106, which supports itself on an outer bearing ring 107. The outer bearing ring 107 can also be designed without a step 108. It is then configured as a ring or hollow cylinder.

A plate 109 is then also present between the rolling elements of the axial bearing part and the planet carrier 103 in order to provide the running surface. It is also naturally possible that the plate 109 and/or the outer bearing shell 106 and/or the inner bearing shell 102 can be eliminated and the respective running surface is designed in the planet carrier 103, the gearbox housing 111, and/or the outer bearing ring 117.

It should be mentioned that a contact flange 121 of the outer bearing ring 117 standing on a contact surface 120 is connected to the planet carrier 103 via a welded connection, but radially supports, or at least radially guides, the axial bearing and thus determines the position. A welding approach can also be used for this instead of the contact flange 121.

Figure 6:
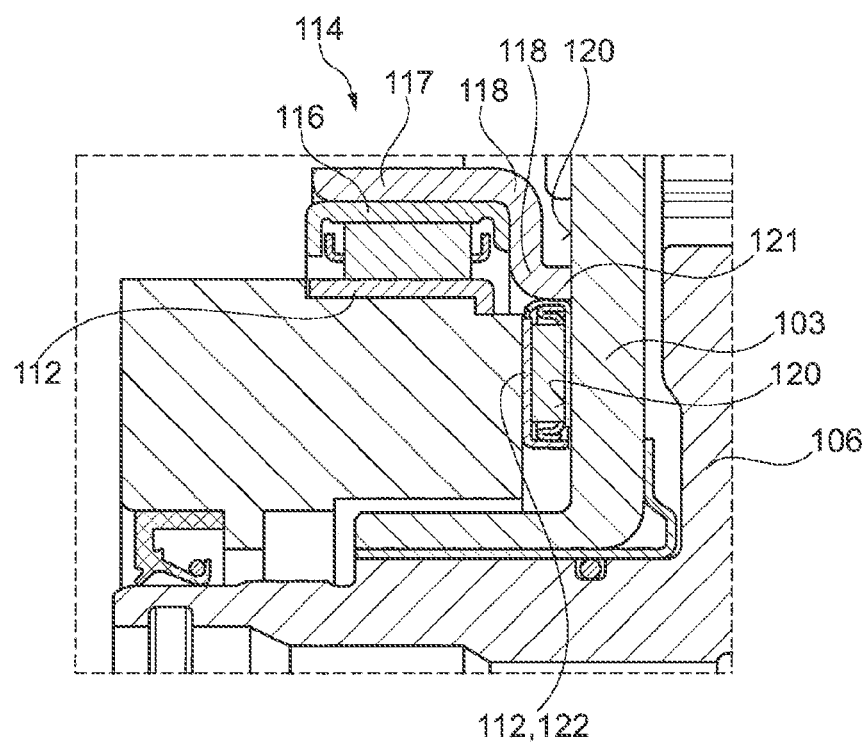
FIG. 6 an enlargement of the roller bearing region of the planetary gearbox shown in FIG. 5.

An enlarged depiction of the combined axial-radial roller bearing 114 is reproduced in FIG. 6. The radial mounting can also be implemented without a roller sleeve if the flange is hardened and the axial securing of the roller cage is guaranteed. The outer bearing ring 117, also designated as the bearing flange, is welded to the planet carrier 103. The plate 119 can also have a bead and/or have a chamfer.

The same applies for an edge ring 122, which also takes over the function of an inner bearing shell 112.

Two different variants of an inventive planetary gearbox 101 are depicted in FIGS. 8 and 9, wherein a combined axial-radial roller bearing and an inclined ball bearing 115 are always combined to mount one and the same planet carrier 103.

Figure 10:
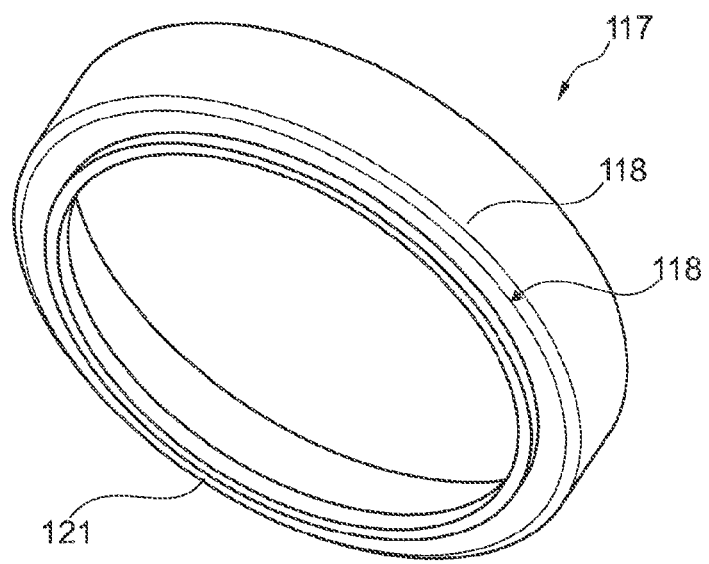
FIG. 10 illustrates a singular, perspective depiction of the outer bearing ring used in the embodiments of FIGS. 5 to 10; and, FIG. 11 illustrates a longitudinal section through the outer bearing ring from FIG. 10.
Figure 11:
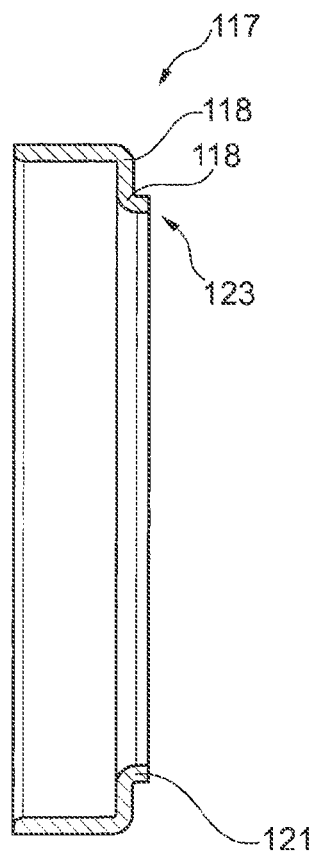

The outer bearing ring 117, designated as a bearing flange and formed from sheet metal, namely vacuum formed sheet steel, is depicted in more detail in FIGS. 10 and 11. The outer bearing ring 117 thereby has the contact flange 121 on a first end 123. The outer bearing ring 117 can also be designed without the two steps 118 and have a uniform wall thickness with one or more chamfers and/or roundings.

The material of the outer bearing ring 117 is respectively curved by 90° at the steps 118. Material can be used that is especially suitable for cold or warm deformation.

LIST OF REFERENCE NUMBERS

1 Planetary gearbox
2 Spur gear differential gear
3 Planet carrier
4 Planet wheel set
5 First planet wheel
6 Second planet wheel
7 Pin
8 Bearing rings
9 Sun gear
10 First sun gear
11 Second sun gear
12 First half
13 Second half
14 Connection element
15 Drive wheel
16 Spur gear
17 Outer helical teeth
18 Connection part
19 Bearing
20 Roller bearing
21 First flange section
22 Connection section
23 Second flange section
24 First boundary surface
25 Inner surface
26 Second boundary surface
27 Outer surface
28 Outer bearing ring
29 Inner bearing ring
30 Shoulder
31 Connection
32 Connection section of the planet carrier
33 Connection section of the connection part
34 Caulking
35 Running surface
36 Rolling elements
37 Friction plate
101 Planetary gearbox
102 Differential gear
103 Planet carrier
104 Bearing sleeve
105 Planet wheel
106 First sun gear
107 Second sun gear
108 Bearing
109 Roller bearing
110 Housing
111 Gearbox housing
112 Inner bearing shell
113 Stud
114 Combined axial-radial roller bearing
115 Inclined roller bearing
116 Outer bearing shell
117 Outer bearing ring
118 Step
119 Plate
120 Contact surface
121 Contact flange
122 Edge ring
123 First end of the outer bearing ring

What is claimed is:

1. A planetary gearbox (1, 101), comprising:
a differential gear (2, 102), having a planet carrier (3, 103) to which planet wheels (5, 6, 105) that are in meshed engagement with at least one sun gear (9, 10, 11, 106, 107) are rotatably connected, wherein:
the planet carrier (3, 103) can be connected to a drive wheel (15);
in addition a bearing (19, 108) having an inner bearing ring (29) and an outer bearing ring (28, 117) rotatably mounts the planet carrier (3, 103) in a stationary housing determining the axial and/or radial position of said carrier;
the outer bearing ring (28, 117) is rotatably fixedly connected to the planet carrier (3, 103);
the inner bearing ring (29) is connected to the stationary housing;
the outer bearing ring (28) is connected to the planet carrier via a connection part (18) separate from two components of the planetary gearbox;
the connection part (18) is designed as a sheet metal sleeve which has a first flange section (21) and a second flange section (23) which are connected to each other via a connection section (22); and, the connection section (22) extends in the radial direction and preferably contacts flatly on the planet carrier (3) partially or completely.

2. The planetary gearbox (1) recited in claim 1, wherein the outer bearing ring (28, 117) is directly force fitted to the planet carrier (3, 103).

3. The planetary gearbox (1) recited in claim 1, wherein the first flange section (21) is spaced radially less far from the rotational axis of the planet carrier (3) than the second flange section (23) which is connected to the outer bearing ring (28) of the roller bearing (20) or forms the same.

4. The planetary gearbox (1) recited in claim 1, wherein the planetary gearbox (1) is designed as a spur gear differential (2).

5. The planetary gearbox recited in claim 1, wherein the outer bearing ring (117) is directly connected firmly bonded to the planet carrier (103).

6. The planetary gearbox recited in claim 5, wherein the outer bearing ring (117) stands with one end on a front end contact surface and is welded there.

7. The planetary gearbox (1) recited in claim 6, wherein the second flange section (23) is arranged oblique to the axial direction and to the radial direction.

8. A planetary gearbox, comprising:
   differential gear;
   a first sun gear;
   a first planet carrier;
   a plurality of planet gears meshed with the first sun gear and connected to the first planet carrier by a plurality of pins;
   a first bearing including:
      a first inner bearing ring arranged to connect to a stationary housing; and,
      a first outer bearing ring arranged:
         radially outward of the first inner bearing ring; and,
         rotatably fixedly connected to the first planet carrier;
   a second sun gear;
   a second planet carrier; and,
   a second bearing including:
      a second inner bearing ring arranged to connect to the stationary housing; and,
      a second outer bearing ring arranged:
         radially outward of the second inner bearing ring; and,
         rotatably fixedly connected to the second planet carrier, wherein the plurality of planet gears is meshed with the second sun gear and connected to the second planet carrier with the plurality of pins.

9. A planetary gearbox, comprising:
   differential gear;
   a first sun gear;
   a first planet carrier;
   a plurality of planet gears meshed with the first sun gear and connected to the first planet carrier by a plurality of pins;
   a first bearing including:
      a first inner bearing ring arranged to connect to a stationary housing; and,
      a first outer bearing ring radially outward of the first inner bearing ring;
   a first connection part:
      rotatably fixedly connecting the first outer bearing ring to the first planet carrier; and,
      and includes first flange section connected to the first planet carrier and located radially inward of the first planet carrier;
   a second sun gear;
   a second planet carrier; and,
   a second bearing including:
      a second inner bearing ring arranged to connect to the stationary housing; and,
      a second outer bearing ring radially outward of the second inner bearing ring; and, a second connection part:
      rotatably fixedly connecting the second outer bearing ring to the second planet carrier; and,
      including a second flange section connected to the second planet carrier and located radially inward of the second planet carrier, wherein the plurality of planet gears is meshed with the second sun gear and connected to the second planet carrier with the plurality of pins.

* * * * *